(12) United States Patent
Hamberger et al.

(10) Patent No.: US 10,068,698 B2
(45) Date of Patent: *Sep. 4, 2018

(54) DEVICE AND METHOD FOR REDUCING A MAGNETIC UNIDIRECTIONAL FLUX COMPONENT OF A TRANSFORMER CORE

(71) Applicant: Siemens Aktiengesellschaft, Munich (DE)

(72) Inventors: Peter Hamberger, Kirchschlag bei Linz (AT); Albert Leikermoser, Salzburg (AT)

(73) Assignee: Siemens Aktiengesellschaft, Munich (DE)

( * ) Notice: Subject to any disclaimer, the term of this patent is extended or adjusted under 35 U.S.C. 154(b) by 47 days.

This patent is subject to a terminal disclaimer.

(21) Appl. No.: 15/038,654

(22) PCT Filed: Dec. 10, 2013

(86) PCT No.: PCT/EP2013/076104
§ 371 (c)(1),
(2) Date: May 23, 2016

(87) PCT Pub. No.: WO2015/086048
PCT Pub. Date: Jun. 18, 2015

(65) Prior Publication Data
US 2016/0300662 A1    Oct. 13, 2016

(51) Int. Cl.
H01F 27/34    (2006.01)
H01F 27/38    (2006.01)
H01F 27/42    (2006.01)
H01F 29/14    (2006.01)

(52) U.S. Cl.
CPC .......... *H01F 27/34* (2013.01); *H01F 27/38* (2013.01); *H01F 27/385* (2013.01); *H01F 27/42* (2013.01); *H01F 2029/143* (2013.01)

(58) Field of Classification Search
CPC .......................................... H01F 27/00–27/36
USPC .................... 336/65, 83, 180–184, 220–223
See application file for complete search history.

(56) References Cited

U.S. PATENT DOCUMENTS

| 2004/0196675 A1 | 10/2004 | Cope et al. |
| 2006/0197511 A1 | 9/2006 | Af Klercker Alakula |

FOREIGN PATENT DOCUMENTS

| CN | 101681716 | 3/2010 |
| CN | 103270561 | 8/2013 |
| CN | 103270562 | 8/2013 |
| WO | WO 2004/013951 | 2/2004 |

(Continued)

*Primary Examiner* — Tuyen Nguyen
(74) *Attorney, Agent, or Firm* — Cozen O'Connor

(57) ABSTRACT

A device for reducing a magnetic unidirectional flux component in the core of a transformer includes at least one compensation winding, which is magnetically coupled to the core of the transformer, at least one switching unit in series with the compensation winding to feed a current into the compensation winding, and at least one current-limiting reactor in series with the compensation winding, wherein two switching units are connected in parallel with each other per current-limiting reactor and the current-limiting reactor comprises two windings, which can be connected either in series or in parallel with each other, in order to reduce the number of current-limiting reactors in comparison with conventional cascaded circuits.

11 Claims, 5 Drawing Sheets

(56) References Cited

FOREIGN PATENT DOCUMENTS

| WO | WO 2012/041367 | 4/2012 |
| WO | WO 2012/041368 | 4/2012 |

DEVICE AND METHOD FOR REDUCING A MAGNETIC UNIDIRECTIONAL FLUX COMPONENT OF A TRANSFORMER CORE

CROSS-REFERENCE TO RELATED APPLICATIONS

This is a U.S. national stage of application No. PCT/EP2013/076104 filed 10 Dec. 2013.

BACKGROUND OF THE INVENTION

1. Field of the Invention

The invention relates to a method and device for reducing a magnetic unidirectional flux component in the core of a transformer, comprising at least one compensation winding magnetically coupled to the core of the transformer, at least one switching unit arranged electrically in series with the compensation winding in a current path, in order to feed a current into the compensation winding, the effect of which is directed opposite to the unidirectional flux component, and at least one current-limiting reactor arranged electrically in series with the compensation winding in a current path.

2. Description of the Related Art

In electrical transformers, such as those used in power distribution networks, a direct current may undesirably feed into the primary winding or secondary winding. Such a direct current feed, also referred to below as a DC component, may originate from electronic structural components, such as those currently used in the activation of electrical drives or also in reactive power compensation. Another cause may be what are known as 'geomagnetically induced currents' (GIC).

In the core of the transformer, a DC component causes a unidirectional flux component that is superimposed onto the alternating flux. This results in a non-symmetrical modulation of the magnetic material in the core and entails a series of disadvantages. A direct current of as little as a few amperes can produce a local temperature rise in the transformer, which can negatively affect the service life of the winding insulation. A further undesirable effect is a raised noise emission during operation of the transformer, because modern transformer cores have a very high magnetic conductivity, so that even low electrical direct currents are sufficient to bring the transformer core, in a half-period of the alternating current, into saturation.

Various active and passive apparatuses are known to reduce the operating noise of a transformer. According to WO 2012/041368 A1, an electrical voltage induced in the compensation winding is used and employed to compensate for the interfering magnetic unidirectional flux component. In this way, a compensation current is generated via an electronic switching unit, where the switching-on of the switching unit follows a predetermined switching strategy, such as via a phase angle control. Here, a thyristor switch is connected in series with a current-limiting reactor to introduce the compensation current into the compensation winding.

By virtue of the cited measures, the thermal load of the winding of the transformer and the losses and noises are lower. Here, the device for reducing a magnetic unidirectional flux component can be realized with comparably simple means using discrete and/or programmable modules. An energy store, such as a battery or a capacitor, is not needed to generate the compensation current; the energy for generating the compensation current is taken directly from the compensation winding. By virtue of its simplicity, the reliability of the switching arrangement is high and well suited to the low-maintenance long-term operation of a transformer in a power distribution network. The field of application comprises both transformers in the low- or medium-voltage range, as well as transformers with a very high power (power transformers, high voltage direct current (HVDC) transformers). Neither the size nor safety-relevant apparatuses or other design criteria of the transformer are disadvantageously influenced by the use of the device.

It is advantageous, in a device for reducing a magnetic unidirectional flux component, for the current-limiting reactor to be installed within the tank of the transformer, in order to use its (oil) cooling. However the current-limiting reactor requires space in the tank of the transformer. Since what is known as a thyristor circuit (consisting of a switching unit embodied as a thyristor and a current-limiting reactor) is often not sufficient to introduce the necessary ampere-turns (i.e., the necessary magnetic force permeation) into the transformer, a number of thyristor circuits are cascaded in a known manner, whereby a number of current-limiting reactors are however also required, as shown in FIG. 2 for instance. Sometimes, in practice, up to four thyristor circuits have to be cascaded, which also means installing four current-limiting reactors into the tank of the transformer. However, a number of current-limiting reactors result in an increased space requirement in the tank of the transformer.

SUMMARY OF THE INVENTION

It is an object of the present invention to provide a device for reducing a magnetic unidirectional flux component in the core of a transformer that, in comparison with conventional cascaded switching circuits (each consisting of a switching unit and a current-limiting reactor), has a lower number of current-limiting reactors.

This and other objects and advantages are achieved in accordance with the invention by a device in which two switching units are connected in parallel with each other per current-limiting reactor, the current-limiting reactor consists of two windings which can be connected either in series or in parallel with each other, where in the case of the parallel connection, the first winding is connected in series with the first switching unit and the second winding is connected in series with the second switching unit, while in the case of the series connection, the first and second winding are connected in series with one another and with the first switching unit.

The configuration of the current-limiting reactor with two windings enables the windings to be connected in series or in parallel. For this reason, the current-limiting reactor can then be switched over from full inductance (series connection) to quarter inductance (parallel connection).

The advantage of the switchable solution lies in the possible reduction in the harmonic component in the compensation current. The required compensation current can be set by switching the switching unit (e.g., firing the thyristor). If a switch is made at the zero induced voltage crossover point, the maximum direct current is set, which is however superimposed with an alternating current having the amplitude of the direct current and the power frequency. If the switching unit is later switched, the direct current is lower, but harmonic alternating currents also develop.

If only one direct current between zero and a quarter of the maximum current has to be introduced as a compensation current, only one switching unit and the current-limiting reactor with full inductance may be used. In the case that the compensation current to be introduced is half of the maximum direct current, a switch is made into the voltage zero crossover and no harmonics develop. If the compensation current to be introduced is above half of the maximum direct current, two switching units are connected in parallel, where a current-limiting reactor with a quarter of the inductance is used in each branch.

If the first and second winding are magnetically coupled with each other by way of a shared magnetic ring, this is advantageous in that any differences in the resistances of the switching units connected in parallel are compensated. This avoids an unequal current distribution onto the two switching units and thus a thermal overload of one switching unit. With an unequal change in the current in the two branches over time, a voltage that counteracts the unequal change in the current over time is induced in the branches. If the same current is flowing in both branches, no magnetic flux is thus induced in the magnetic ring.

The two windings of the current-limiting reactor and the shared magnetic ring can be configured such that the first and second winding are each wound around a magnetic limb, the two limbs are aligned in parallel with each other and are each connected to one another on their end faces by a magnetic yoke.

At least one magnetic yoke may have two yoke limbs that are each connected to one another on their ends, where a number of turns of the first winding are wound over a yoke limb and the same number of turns of the second winding are wound in the opposite direction over the other yoke limb. The windings wound over the yoke limb are auxiliary or additional windings, which perform the function of a toroidal core. Coolant in the tank of the transformer can be passed through the slot between the two yoke limbs and said slot thus promotes the flow of coolant through the windings.

The switching unit may contain at least one semiconductor switch, preferably a thyristor. The advantage of using a thyristor is that a thyristor can be 'fired' with a current pulse, in other words can be brought into the conducting state. During the positive half-wave of the supply voltage, the thyristor has the property of a diode until the next zero current crossover. The end of the current flow duration is effected by the thyristor itself, by the holding current not being met and the thyristor automatically being "extinguished", in other words passing into the non-conducting state. Other semiconductor switches, such as GTO, IGBT transistors or other switching elements are naturally also conceivable.

The switching unit can be advantageously connected to a control unit, which is connected to a measuring apparatus for detecting the magnetic unidirectional flux component.

Wo 2012/041368 A1 discloses an exemplary measuring apparatus for detecting the magnetic unidirectional flux component, which comprises a magnetic shunt part with a sensor coil there. The magnetic shunt part is arranged on the core of the transformer, such as on a limb or adjacent to the yoke, in order to guide part of the magnetic flux in a bypass. From this magnetic flux established in the shunt, a sensor signal with long-term stability can be very easily obtained via a sensor coil, where the sensor signal very effectively reproduces the unidirectional flux component (DC component), if applicable after signal processing. The measurement output is largely free of drift and has long-term stability. Since this detector substantially consists of the magnetic shunt part and the sensor coil arranged thereupon, it has a high reliability.

The sensor signal from the measuring apparatus to detect the magnetic unidirectional flux component is supplied to the control apparatus. Here, the switching unit is controlled with a manipulated variable for instance, which is predetermined by a timer available in the control apparatus, where the timer is triggered by a phase detector, which detects the phase of the voltage induced in the compensation winding. The timer may be a discrete component or part of a digital circuit. It may be advantageous if the manipulated variable is the output of a computing operation of a microprocessor. Here, the microprocessor may also be used simultaneously for the signal processing of the sensor signal. The switching unit can be activated, for instance, such that a pulsing direct current is fed into the compensation winding. This is advantageous in that the arithmetic mean value of this pulsing direct current can be predetermined very easily in accordance with the DC component to be compensated. For the purpose of reducing the magnetic energy stored in the inductor, the electronic switching unit expediently remains switched on until the pulsing direct current has decayed. After the electrical switching unit is switched off, an overvoltage protection thus has to absorb virtually no magnetic residual energy stored in the coil.

It may be advantageous if the switching unit and the control apparatus are arranged outside of the tank of a transformer. As a result, the entire electronic circuit is accessible from the outside for inspection and maintenance purposes.

The method for operating the device in accordance with the invention provides that in the case where at most only a quarter of the maximum possible compensation current is required, the two windings of the current-limiting reactor are connected in series with each other and only one switching unit is used, while in the case where more than a quarter of the maximum possible compensation current is needed, the two windings of the current-limiting reactor are connected in parallel with each other and both switching units are used.

For the switchover between parallel and series connection, a control criterion with hysteresis can be used to reduce the switchover frequency if the compensation current to be introduced lies in the range of a quarter of the maximum possible compensation current.

Provision can be made for the controller for controlling the switching units to comprise a timer, which is triggered by a phase detector, which detects the phase of the voltage induced in the compensation windings, and activates the switching unit such that a pulsing direct current is fed into the compensation windings, as is already shown in WO 2012/041368 A1.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made in the following part of the description to the figures, from which further advantageous embodiments, details and developments of the invention can be inferred, in which.

DETAILED DESCRIPTION OF THE EXEMPLARY EMBODIMENTS

According to the prior art, with what is known as direct current compensation, direct current is selectively introduced into a compensation winding K to cancel out the direct current magnetization of the transformer core. To introduce the necessary magnetic force permeation (i.e., direct current ampere-turns) into the compensation winding K, use is made of the alternating voltage induced in the compensation winding K. Here, the compensation winding K acts like an alternating voltage source. On the compensation winding K, a switching unit T formed as a thyristor is connected in series with a current-limiting reactor L. The required direct current can be set via a voltage-synchronous firing at a specific firing time of the thyristor T. If the thyristor is fired at the zero voltage crossover, the maximum direct current is set, which is however superimposed with an alternating current having the amplitude of the direct current and the power frequency. If the thyristor T is later fired, the direct current is lower, but harmonic alternating currents also develop. The current profile in the thyristor T is limited by a current-limiting reactor L; the permissible thermal load of the thyristor T is the dimensioning factor for the current limitation.

Figure 2:
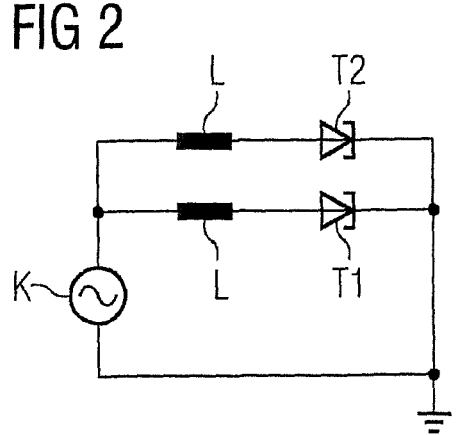
FIG. 2 shows a block diagram in accordance with the prior art for introducing compensation current into a compensation winding, comprising two thyristor circuits.
Figure 3:
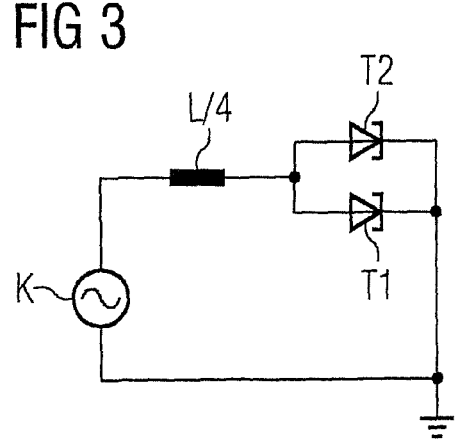
FIG. 3 shows a block diagram for introducing compensation current into a compensation winding, in accordance with an alternative conventional solution.

If one thyristor circuit (consisting of a thyristor T in series with a current-limiting reactor L) is not sufficient to introduce the necessary magnetic force permeation, then a number of thyristor circuits can be cascaded, in other words connected in parallel, as shown in FIG. 2 for two thyristor circuits L, T1; L, T2.

Figure 1:
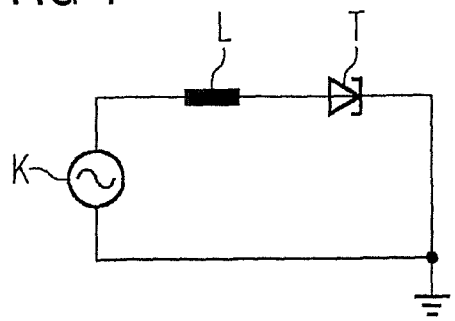
FIG. 1 shows a block diagram in accordance with the prior art for introducing compensation current into a compensation winding, comprising a thyristor circuit.

In order to then reduce the number of current-limiting reactors L, it is possible to only connect the thyristors T1, T2 in parallel with one another and to connect this parallel connection in series with a current-limiting reactor L/4 with a quarter of the inductance of the current-limiting reactor L from FIG. 1 or 2.

The current-limiting reactor L/4 has approximately the same size as the current-limiting reactor L with full inductance, since it only has half the number of turns. However, four times the amount of current flows. Consequently, it also requires approximately four times the conductor cross-section. The problem is now that the resistances of the thyristors T1, T2 are small, which is good in itself, but these resistances may fluctuate. This resistance fluctuation may result in an unequal current distribution in the thyristors T1, T2 and therefore in a thermal overload of a thyristor T1, T2.

Figure 4:
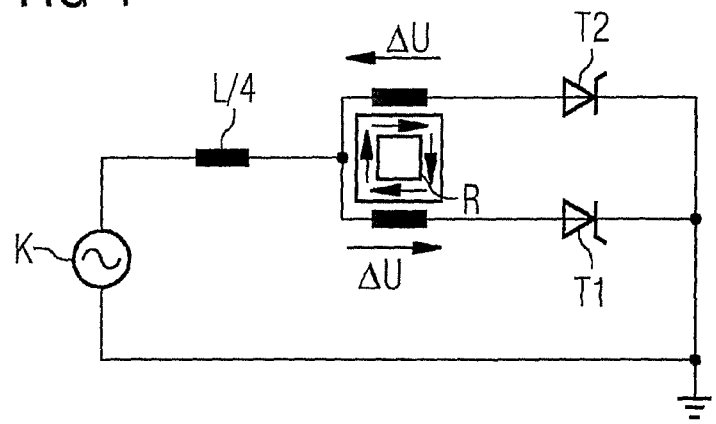
FIG. 4 shows a block diagram of FIG. 3, with a magnetic coupling.

The solution to the problem now consists in coupling both thyristors T1, T2 by way of a magnetically highly conductive toroidal core R, as is shown schematically in FIG. 4. With an unequal change in the current or voltage over time, ΔU, in the two thyristor circuits, a voltage is induced in the thyristor circuits, which counteracts the unequal change over time. If the same current is flowing in both thyristor circuits, then no magnetic flux is induced in the toroidal core R.

Figure 8:
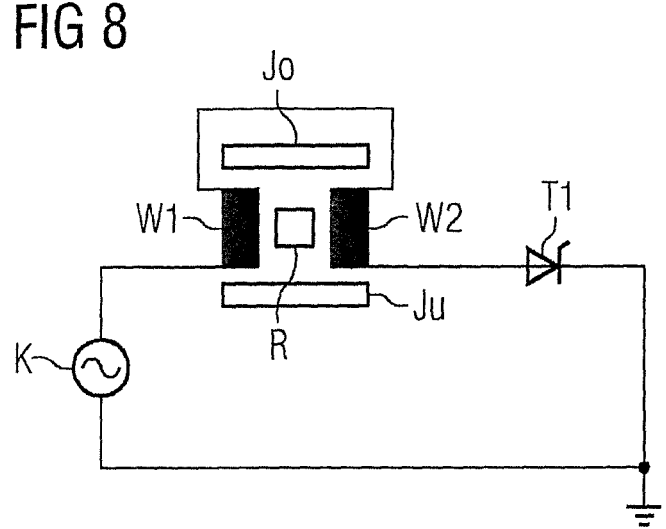
FIG. 8 shows a current-limiting reactor with a series connection between the two windings in accordance with the invention.
Figure 9:
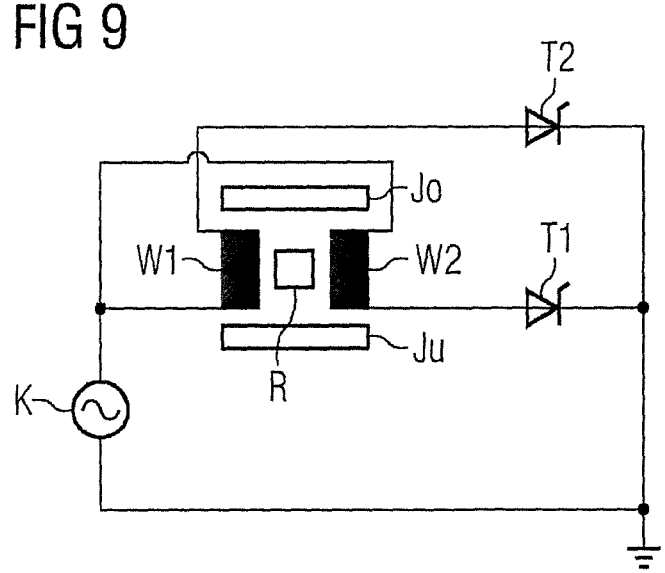
FIG. 9 shows a current-limiting reactor with a parallel connection between the two windings in accordance with the invention.

A suitable design of the current-limiting reactor L/4 enables the function of the toroidal core R from FIG. 4 to be integrated into the current-limiting reactor L/4. Two thyristors T1, T2 are connected in parallel with each other; the current-limiting reactor L/4 consists of two windings W1, W2, which can be connected either in series or in parallel with one another, where in the case of the parallel connection, the first winding W1 is connected in series with the first thyristor T1 and the second winding W2 is connected in series with the second thyristor T2, while in the case of the series connection, the first and second winding W1, W2 are connected in series with each other and with the first thyristor T1. This configuration is shown in FIGS. 8 and 9.

Figure 5:
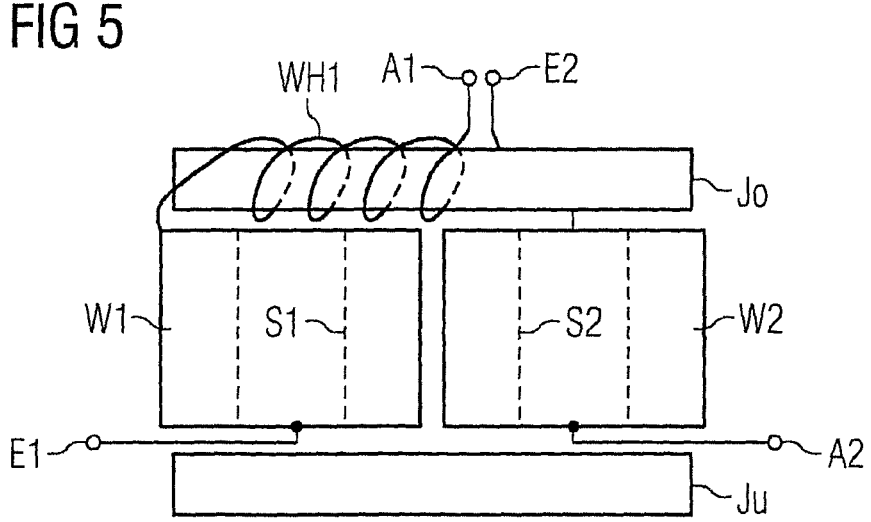
FIG. 5 shows a schematic representation of a current-limiting reactor in accordance with the invention.
Figure 6:
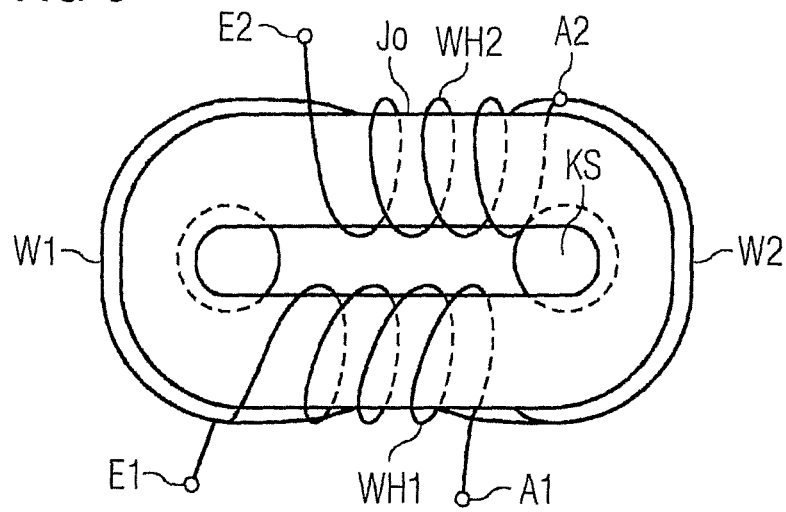
FIG. 6 shows a plan view of the current-limiting reactor of FIG. 5.

The structure of a current-limiting reactor L/4 in accordance with the invention is shown in FIGS. 5 and 6. The first winding W1 is wound around a first magnetic limb S1, and the second winding W2 is wound around a second magnetic limb S2. The two limbs S1, S2 are aligned in parallel with each other and connected, i.e., magnetically coupled, with one another on their end faces by a magnetic yoke Jo, Ju in each case.

The yokes Jo, Ju are formed as winding cores with an inner slot KS. A magnetic yoke Jo, Ju thus has two yoke limbs connected to each other at each of its ends. Here, the yokes Jo, Ju are shaped as oval rings, each having two straight yoke limbs and two curved, for instance semicircular, yoke parts that connect the two yoke cores with one another. Each yoke Jo, Ju is generally formed as a single piece.

A number of turns of the first winding W1 as first auxiliary winding WH1 are wound over the one yoke limb of the upper yoke Jo and the same number of turns of the second winding W2 as second auxiliary winding WH2 are wound over the other yoke limb in the opposite direction. The input E1 of the first winding is disposed on the underside of the winding W1. The output A1 is disposed on the top side of the yoke Jo downstream of the first auxiliary winding WH1. The input E2 of the second winding W2 is disposed on the top side of the yoke Jo upstream of the second auxiliary winding WH2, the output A2 of the second winding W2 is disposed on the underside of the second winding W2.

The first and second winding W1, W2 are magnetically coupled to each other via a shared magnetic ring, consisting of a first and second limb S1, S2 and the two yokes Jo, Ju. The first and second winding W1, W2 are extended by the auxiliary windings WH1, WH2 over the yoke JO acting as a winding yoke. The two auxiliary windings WH1, WH2 have the same number of turns. The winding direction is thus configured such that the linked flux is zero. No flux is then induced in the toroidal core R when the current in the windings W1, W2 is the same. With unequal currents, a magnetic flux develops in the toroidal core R, as a result the construction acts like a conventional toroidal core for the two windings W1, W2 and an unequal distribution of the currents in the two windings W1, W2, and thus an unequal current distribution in the two thyristors T1, T2 is counteracted.

The device in accordance with the invention, consisting of a current-limiting reactor L/4 and two thyristors T, is generally arranged in and/or on the transformer tank. The slot KS of the yokes Jo, Ju then also serves as a cooling duct, in order to promote the oil flow through the windings W1, W2.

Figure 7:
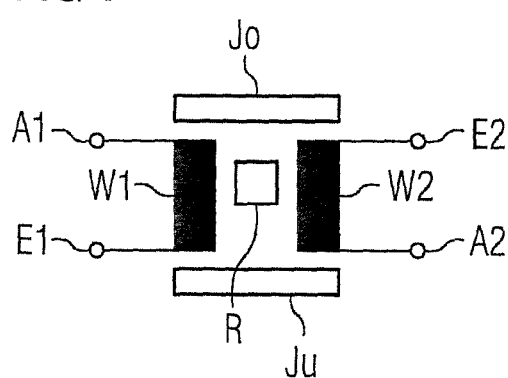
FIG. 7 shows a block diagram of the current-limiting reactor of FIGS. 5 and 6.

A current-limiting reactor L/4 in accordance with the invention is shown symbolically in FIG. 7, where the small quadrant between the windings W1 and W2 represents the magnetic coupling over the toroidal core R.

The configuration of the current-limiting reactor L/4 in accordance with the invention allows the two windings W1, W2 to be connected either in series or in parallel. As a result, it is possible to switch over from full to quarter inductance with one and the same reactor. The additional or auxiliary windings WH1, WH2 over the toroidal yoke S1, S2, Jo, Ju compensate for an unequal current distribution.

The series connection of the two windings W1, W2 is shown in FIG. 8 where only the first thyristor T1 is used. The current-limiting reactor has the full inductance, the same current flows through both windings W1, W2, where the toroidal core R has no effect. The series connection is used if only a direct current of between zero and a quarter of the maximum possible compensation current is to be introduced. In this case, it is sufficient to use just one thyristor T1 and the current-limiting reactor with full inductance. However, a harmonic component in the compensation current is accepted here, because the thyristor T1 is connected with a time delay on account of the lower current requirement.

In the case where the current to be introduced into the compensation winding amounts to a quarter of the maximum direct current, the series connection according to FIG. 8 is again used. However, the thyristor T1 is connected without a time delay so that no harmonic components occur.

The parallel connection of the two windings W1, W2 is shown in FIG. 9, where both thyristors T1, T2 are used. The current-limiting reactor has a quarter of the inductance, and the toroidal core R ensures that a different current increase over both windings W1, W2 is compensated. The parallel connection is used if more than a quarter of the maximum possible current is required.

With all disclosed embodiments, the compensation current begins to flow when the switching apparatus is switched, in other words when the thyristors T1, T2 are fired. The thyristors can be controlled as in WO 2012/041368 A1: the control unit consists substantially of a phase detector and a timer. The phase detector, e.g., a zero crossover detector, deduces from the induced voltage a trigger signal, which is supplied to a timer. Together with a control signal that is likewise supplied to the control unit, the control unit provides a manipulated variable on the output side that is routed to the thyristor T1, T2. The inductances of the windings W1, W2 are established such that when the thyristors T1, T2 are switched through, a pulsing current profile flowing in a current direction is fed into the compensation winding K. In this case, the thyristor T is connected in the currentless state to the end of the direct current pulse, such as by the holding current of the thyristor not being met.

For the switchover between parallel and series connection, which can be effected with the same control unit as that for the connection of the thyristors T1, T2, a control criterion with hysteresis is best used to reduce the switchover frequency if the compensation current to be introduced is in the range of half of the maximum possible compensation current.

A number of devices in accordance with the disclosed embodiments, each consisting of a current-limiting reactor L/2 and two thyristors T, can also be connected in parallel, if a higher compensation current than with the parallel connection of FIG. 9 is required.

Figure 10:
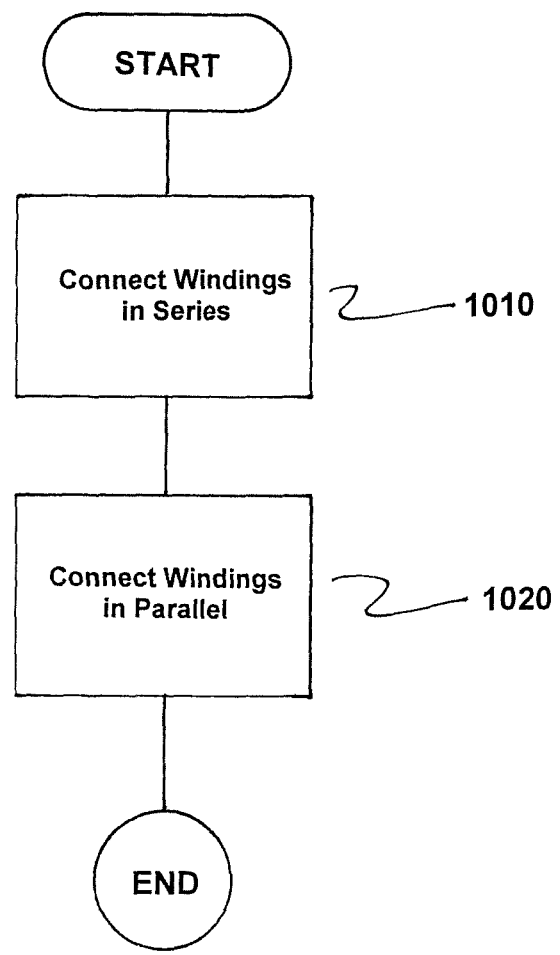
FIG. 10 is a flowchart of the method in accordance with the invention.

FIG. 10 is a flowchart of operating a device. The method comprises connecting two windings (W1, W2) of a current-limiting reactor (L/4) in series with each other, as indicated in step 1010. Here, only one switching unit (T1) being used in cases where at most only a quarter of the maximum possible compensation current is required. Next, the two windings (W1, W2) of the current-limiting reactor (L/4) are connect in parallel with each other, as indicated in step 1020. Here, two switching units (T1, T2) are used in cases where more than a quarter of the maximum possible compensation current is required.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for reducing a magnetic unidirectional flux component in a core of a transformer, comprising:
    at least one compensation winding magnetically coupled to the core of the transformer;
    at least one switching unit arranged electrically in series with the at least one compensation winding in a current path to feed a current into the at least one compensation winding, an effect of which is directed opposite to a unidirectional flux component; and
    at least one current-limiting reactor arranged electrically in series with the at least one compensation winding in the current path;
    wherein two switching units are connected in parallel with each other per current-limiting reactor;
    wherein the current-limiting reactor consists of two windings which are connectable in series or in parallel with each other;
    wherein in cases of the parallel connection, the first winding is connected in series with a first switching unit and the second winding is connected in series with a second switching unit; and
    wherein in cases of the series connection, the two windings are connected in series with one another and with the first switching unit.

2. The device as claimed in claim 1, wherein the first and second winding are magnetically coupled to each other via a shared magnetic ring.

3. The device as claimed in claim 2, wherein the first and second winding are each wound around a magnetic limb, two limbs being aligned in parallel with each other and each being connected to one another on their end faces by a magnetic yoke.

4. The device as claimed in claim 3, wherein at least one magnetic yoke has two yoke limbs each connected to one another at their ends, wherein a number of turns of the first winding are wound over a yoke limb and the same number of turns of the second winding are wound in the opposite direction over the other yoke limb.

5. The device as claimed in claim 1, wherein the switching unit contains at least one semiconductor switch.

6. The device as claimed in claim 1, wherein the switching unit is connected to a control unit, which is connected to a measuring apparatus for detecting the magnetic unidirectional flux component.

7. The device as claimed in claim 5, wherein at least one semiconductor switch is a thyristor.

8. A method for operating a device a magnetic unidirectional flux component in a core of a transformer, the device comprising at least one compensation winding magnetically coupled to the core of the transformer, at least one switching unit arranged electrically in series with the at least one compensation winding in a current path to feed a current into the at least one compensation winding, an effect of which is directed opposite to a unidirectional flux component; and at least one current-limiting reactor arranged electrically in series with the at least one compensation winding in the current path, two switching units being connectable in parallel with each other per current-limiting reactor and the current-limiting reactor consisting of two windings which are connectable in series or in parallel with each other, the method comprising:

connecting the two windings of the current-limiting reactor in series with each other, only one switching unit being used in cases where at most only a quarter of a maximum possible compensation current is required; and connecting the two windings of the current-limiting reactor in parallel with each other, two switching units being used in cases where more than a quarter of the maximum possible compensation current is required;

wherein in cases of the parallel connection, the first winding is connected in series with the first switching unit and the second winding is connected in series with the second switching unit; and wherein in cases of the series connection, the two windings are connected in series with one another and with the first switching unit.

9. The method as claimed in claim 8, wherein a control criterion with hysteresis is used for the switchover between a parallel and series connection.

10. The method as claimed in claim 8, wherein a controller for controlling the switching units comprises a timer, which is triggered by a phase detector, which detects a phase of voltage induced in a compensation winding and activates a switching unit such that a pulsing direct current is fed into the compensation winding.

11. The method as claimed in claim 9, wherein a controller for controlling the switching units comprises a timer, which is triggered by a phase detector, which detects a phase of voltage induced in a compensation winding and activates a switching unit such that a pulsing direct current is fed into the compensation winding.

\* \* \* \* \*